Patented Feb. 13, 1951

2,541,126

UNITED STATES PATENT OFFICE 2,541,126

UNSATURATED ESTERS OF 10-HENDECENOIC ACID

Daniel Swern and Edmund F. Jordan, Jr., Philadelphia, Pa., assignors to the United States of America as represented by the Secretary of Agriculture No Drawing. Application September 10, 1948, Serial No. 48,542

1 Claim. (Cl. 260—86.1)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to unsaturated esters of 10-hendecenoic acid represented by the formula $CH_2=CH-(CH_2)_8-COO-R$ wherein R is a radical selected from the group consisting of vinyl, allyl, methylallyl, chloroallyl, and furfuryl radicals, and to polymeric substances derived from these esters and has among its objects the provision of such compositions of matter and processes for their preparation. Other objects and advantages will be apparent from the following description of the invention.

We have found that vinyl 10-hendecenoate is formed on acidolysis of a vinyl ester, such as vinyl acetate, with 10-hendecenoic acid, in the presence of mercuric acetate and 100% sulfuric acid as catalyst. The allyl, chloroallyl such as 2-chloroallyl, and methyl allyl esters such as crotyl and 1-methallyl esters of 10-hendecenoic acid can be prepared by direct esterification of the acid with the corresponding alcohol in the presence of a suitable esterification catalyst such as naphthalenesulfonic acid, and an entraining agent, for example, benzene, adapted to remove the water formed during the reaction. Other unsaturated esters of 10-hendecenoic acid, such as 2-methylallyl and furfuryl 10-hendecenoate are obtained by alcoholysis of methyl 10-hendecenoate with the appropriate alcohol, using the corresponding sodium alcoholate as catalyst.

We have further found that the tendency to polymerize displayed by unsaturated esters of 10-hendecenoic acid varies greatly depending on the nature of the olefinic alcohol radical, and that polymers ond copolymers derived from some of these esters possess properties unlike those of analogous products obtained from the corresponding esters of other monounsaturated, olefinic fatty acids.

Thus, vinyl 10-hendecenoate, when heated at 100° C. in the presence of 1% of benzoyl peroxide as catalyst, is converted within 2 hours, to a soft, crumbly transparent gel; at 80° C. complete gelation requires approximately sixteen hours.

When the allyl or methylallyl 10-hendecenoates are heated in the presence of 0.5% benzoyl peroxide, first for 65 hours at 50° C., then for 48 hours at 65–70° C., and finally for 24 hours at 85° C., only a small amount of the ester undergoes polymerization as evidenced by the reduction in the iodine number of only about ten percent. Under identical conditions 2-chloroallyl 10-hendecenoate is completely polymerized to a soft, transparent, pale yellow crumbly gel. The cross-linking tendencies of 2-chloroallyl 10-hendecenoate thus differ markedly from those of the corresponding oleate which does not form a gel even when heated for about 60 hours at 100° C. in the presence of 1% benzoyl peroxide.

Copolymers obtained by conjoint polymerization of a vinyl monomer, such as vinyl acetate, with varying amounts of unsaturated esters of 10-hendecenoic acid are insoluble, infusible products ranging in physical appearance from hard, glass-like resins to soft crumbly gels. The copolymers formed from mixtures of vinyl acetate with vinyl, allyl, or methallyl 10-hendecenoate, wherein the amount of the alkenyl ester of hendecenoic acid exceeds 20 to 30 percent, by weight, of the monomer mixture, are soft, insoluble products whereas tough elastic insoluble vinyl acetate copolymers are obtained from mixtures containing as much as about 50 percent, by weight, of 2-chloroallyl 10-hendecenoate.

The esters of this invention are thus useful for various purposes in the production of synthetic plastics and similar compositions. They can be utilized in the preparation of insoluble resinous materials by copolymerization with other monomers which polymerize to give soluble products. The alkenyl esters which, as such, do not readily undergo polymerization, like the methylallyl hendecenoates, are also adapted for use as plasticizers and modifying agents. Chloroalkenyl esters, like chloroallyl hendecenoates, are suitable for the production of a wide range of copolymers and impart superior properties to the resulting products.

The following examples are illustrative of the invention:

EXAMPLE I

*Preparation of vinyl 10-hendecenoate*

Eighty-three grams (0.45 mole) of 10-hendecenoic acid, M. P. 24.3°–24.5° C. and neutralization equivalent 185, was dissolved in 232 grams (2.70 moles) of freshly distilled vinyl acetate, B. P. 73° C., and 1.7 grams of mercuric acetate and 0.15 ml. of 100% sulfuric acid were added. The solution was refluxed for three hours in an atmosphere of nitrogen and the sulfuric acid was then neutralized by the addition of sodium acetate. Excess vinyl acetate was recovered by distillation at atmospheric pressure and the distillation was then completed at about 10 mm. pressure. Vinyl 10-hendecenoate was obtained in about 70% yield as a colorless liquid which on redistillation had the following characteristics:

| | |
|---|---|
| B. P. | 124°–124.5° C./10 mm. |
| $n_D^{30}$ | 1.4442 |
| $d_4^{30}$ | 0.8799 |
| Molecular refraction | 63.5 (calcd. 63.0) |
| Iodine number | 238 (calcd. 241) |

EXAMPLE II

Preparation of allyl 10-hendecenoate

Seventy-four grams (0.4 mole) of 10-hendecenoic acid, 43.5 grams (0.8 mole) of allyl alcohol, 1.5 grams naphthalene-2-sulfonic acid and 250 ml. of benzene were refluxed for five hours. The water formed during the reaction was removed azeotropically with the benzene, and the benzene was returned continuously to the reaction mixture. The acid catalyst was then neutralized by the addition of sodium bicarbonate. The benzene was recovered by distillation at atmospheric pressure and the unreacted allyl alcohol was distilled off at 100 mm. The pressure was then reduced to 50 mm. and allyl 10-hendecenoate was obtained in about 90% yield as a colorless liquid, which on redistillation had the following characteristics:

| | |
|---|---|
| B. P. | 179.5°–180° C./50 mm. |
| $n_D^{30}$ | 1.4448 |
| $d_4^{30}$ | 0.8802 |
| Molecular refraction | 67.9 (calcd. 67.6) |
| Iodine number | 227 (calcd. 226) |
| Saponification equivalent | 225 (calcd. 224) |

EXAMPLE III

Preparation of 2-chloroallyl 10-hendecenoate 2-chloroallyl 10-hendecenoate was prepared as described in Example II from 74 grams (0.4 mole) of 10-hendecenoic acid, 74 grams (0.8 mole) of 2-chloroallyl alcohol, 1.5 grams of naphthalene-2-sulfonic acid and 250 ml. of benzene. It was obtained in 90% yield as a colorless liquid which on redistillation had the following characteristics:

| | |
|---|---|
| B. P. | 144.5°–145.5° C./4.5 mm. |
| $n_D^{30}$ | 1.4569 |
| $d_4^{30}$ | 0.9711 |
| Molecular refraction | 72.5 (calcd. 72.4) |

EXAMPLE IV

Preparation of crotyl 10-hendecenoate

Crotyl 10-hendecenoate was prepared as described in Example II, using 74 grams (0.4 mole) of 10-hendecenoic acid, 58 grams (0.8 mole) of crotyl alcohol, 1.5 grams of naphthalene-2-sulfonic acid and 250 ml. benzene. The ester was obtained in about 90% yield as a colorless liquid which on redistillation had the following characteristics:

| | |
|---|---|
| B. P. | 157°–158° C./10.5 mm. |
| $n_D^{30}$ | 1.4483 |
| $d_4^{30}$ | 0.8796 |
| Molecular refraction | 72.7 (calcd. 72.2) |
| Iodine number | 212 (calcd. 213) |
| Saponification equivalent | 241 (calcd. 238) |

EXAMPLE V

Preparation of 1-methylally 10-hendecenoate 1-methylallyl 10-hendecenoate was prepared as described in Example II, using 74 grams (0.4 mole) of 10-hendecenoic acid, 58 grams (0.8 mole) of 3-buten-2-ol (methyl vinyl carbinol), 1.5 grams naphthalene-2-sulfonic acid and 250 ml. benzene. The reaction mixture was refluxed for 24 hours. The ester was obtained in about 85% yield as a colorless liquid which on redistillation had the following characteristics:

| | |
|---|---|
| B. P. | 145°–146° C./11 mm. |
| $n_D^{30}$ | 1.4417 |
| $d_4^{30}$ | 0.8700 |
| Molecular refraction | 72.6 (calcd. 72.2) |
| Iodine number | 212 (calcd. 213) |
| Saponification equivalent | 241 (calcd. 238) |

EXAMPLE VI

Preparation of 2-methylallyl 10-hendecenoate

A freshly cut piece of metallic sodium weighing 0.35 gram was dissolved in 126 grams (1.75 moles) of methylallyl alcohol, and 69 grams (0.35 mole) of methyl 10-hendecenoate (prepared from 10-hendecenoic acid by esterification with anhydrous methanol, 95% sulfuric acid being employed as catalyst) was added. The solution was heated on the steam bath (95°–99° C.) for five hours in an atmosphere of nitrogen, and excess methylallyl alcohol was then recovered by distillation at 100 mm. pressure. The distillation was then completed at about 10 mm. pressure and 2-methylallyl 10-hendecenoate was obtained in about 70% yield as a colorless liquid which on redistillation had the following characteristics:

| | |
|---|---|
| B. P. | 151°–152° C./10 mm. |
| $n_D^{30}$ | 1.4467 |
| $d_4^{30}$ | 0.8778 |
| Molecular refraction | 72.4 (calcd. 72.2) |
| Iodine number | 214 (calcd. 213) |
| Saponification equivalent | 239 (calcd. 238) |

EXAMPLE VII

Preparation of furfuryl 10-hendecenoate

Furfuryl 10-hendecenoate was prepared as described in Example VI, using 172 grams (1.75 moles) of furfuryl alcohol, 69 grams (0.35 mole) of methyl 10-hendecenoate and 0.35 gram of sodium. Unreacted furfuryl alcohol was distilled off at 50 mm. and furfuryl 10-hendecenoate was obtained as a pale yellow liquid which on redistillation had the following characteristics:

| | |
|---|---|
| B. P. | 164°–165° C./4.3 mm. |
| $n_D^{30}$ | 1.4671 |
| $d_4^{30}$ | 0.9675 |
| Molecular refraction | 75.8 (calcd. 75.8) |
| Saponification equivalent | 261 (calcd. 264) |

EXAMPLE VIII

Mixtures of vinyl acetate with vinyl 10-hendecenoate, allyl 10-hendecenoate, methylallyl 10-hendecenoate and 2-chloroallyl 10-hendecenoate, respectively, to each of which 0.5% by weight of benzoyl peroxide was added, were copolymerized by the procedure described by Guile and Huston, Laboratory Manual of Synthetic Plastics and Resinous Materials 1944, p. 99. The composition of the monomer mixtures used and the physical properties of the resulting copolymerization products are shown in the following table:

| Composition of Monomer Mixture (in parts by weight) | | Polymerizate | |
|---|---|---|---|
| Vinyl Acetate | Ester | Solubility | Physical Appearance |
| 100 | 0 | S | Hard, glasslike, colorless. |
| | Vinyl 10-Hendecenoate: | | |
| 99 | 1 | I | Tough, hard, colorless. |
| 90 | 10 | I | Do. |
| 80 | 20 | I | Tough, elastic, colorless. |
| 70 | 30 | I | Do. |
| 60 | 40 | I | Soft, crumbly, colorless. |
| | Allyl 10-Hendecenoate: | | |
| 99 | 1 | I | Tough, hard, colorless. |
| 90 | 10 | I | Do. |
| 80 | 20 | I | Tough, elastic, colorless. |
| 70 | 30 | I | Soft, colorless. |
| 60 | 40 | I | Soft, crumbly, colorless. |
| | 2-Methylallyl 10-Hendecenoate: | | |
| 99 | 1 | I | Tough, hard, colorless. |
| 90 | 10 | I | Do. |
| 80 | 20 | I | Tough, elastic, colorless. |
| 70 | 30 | I | Soft, colorless. |
| 60 | 40 | I | Soft, easily torn, colorless. |
| | 2-Chloroallyl 10-Hendecenoate: | | |
| 99 | 1 | I | Tough, hard, colorless. |
| 90 | 10 | I | Do. |
| 80 | 20 | I | Tough, elastic, colorless. |
| 70 | 30 | I | Do. |
| 60 | 40 | I | Tough, elastic, pale yellow. |
| 40 | 60 | I | Soft, crumbly, pale yellow. |

S=Soluble at room temperature in acetone, amyl acetate and acetic acid.
I=Insoluble in boiling acetone and benzene, and in amyl acetate and acetic acid at 100° C.

Analogous results are obtained if the polymerization is conducted using other organic peroxides or similar polymerization catalyst, such as persulfates and the like, in place of benzoyl peroxide.

Having thus described our invention, we claim:

A copolymer of vinyl acetate and 2-chloroallyl 10-hendecenoate, said copolymer containing about from 1 to 50 percent, by weight, of said 2-chlorallyl 10-hendecenoate.

DANIEL SWERN.
EDMUND F. JORDAN, Jr.

REFERENCES CITED

The following references are of record in the file of this patent:

UNITED STATES PATENTS

| Number | Name | Date |
|---|---|---|
| 2,118,864 | Reppe et al. | May 31, 1938 |
| 2,299,862 | Toussaint et al. | Oct. 27, 1942 |
| 2,332,896 | D'Alelio | Oct. 26, 1943 |
| 2,361,027 | Hansley et al. | Oct. 24, 1944 |
| 2,374,081 | Dean | Apr. 17, 1945 |
| 2,475,557 | Swern et al. | July 5, 1949 |

FOREIGN PATENTS

| Number | Country | Date |
|---|---|---|
| 581,501 | Great Britain | Oct. 15, 1946 |
| 846,063 | France | May 27, 1939 |